United States Patent [19]

Winston

[11] Patent Number: 4,675,828

[45] Date of Patent: Jun. 23, 1987

[54] ENERGY COST ALLOCATION SYSTEM

[75] Inventor: Arthur W. Winston, Lexington, Mass.

[73] Assignee: Wincom Corporation, Salem, Mass.

[21] Appl. No.: 538,893

[22] Filed: Oct. 4, 1983

[51] Int. Cl.⁴ ............... G06F 15/56; G01K 17/06
[52] U.S. Cl. .................. 364/483; 340/870.03; 364/464; 364/505
[58] Field of Search ............... 364/483, 481, 491, 492, 364/493, 464, 505, 900; 307/31, 39, 52; 340/825.52, 870.03

[56] References Cited

U.S. PATENT DOCUMENTS

| | | | |
|---|---|---|---|
| 4,146,923 | 3/1979 | Borkan | 307/52 |
| 4,321,477 | 3/1982 | Bartlett | 364/492 |
| 4,349,879 | 9/1982 | Peddie et al. | 307/52 |
| 4,388,611 | 6/1983 | Haferd | 364/483 |
| 4,425,628 | 1/1984 | Bedard et al. | 364/900 |
| 4,442,492 | 4/1984 | Karlsson et al. | 364/464 |
| 4,484,258 | 11/1984 | Miller et al. | 364/492 |
| 4,497,031 | 1/1985 | Froehling et al. | 364/505 |
| 4,568,934 | 2/1986 | Allgood | 364/464 X |
| 4,575,801 | 3/1986 | Hoberman et al. | 364/483 |

Primary Examiner—Felix D. Gruber
Attorney, Agent, or Firm—Schiller, Pandiscio & Kusmer

[57] ABSTRACT

A system for allocating energy use among a plurality of heat exchange terminals each of which includes a heat exchanger and an electrically driven motor and electrical controls for controlling the operation of the motor. Each heat exchange terminal has associated therewith a uniquely address-coded monitor connected for metering the condition of the motor controls. A central control console periodically polls the monitors at each address code, and in response the polled monitor sends to the interrogating console data indicating the status of the associated motor controls. Memory is provided for accumulating the data so that at the end of a predetermined period the console can compute the proportion of total energy used by each terminal and prepare bills therefrom.

12 Claims, 6 Drawing Figures

ENERGY COST ALLOCATION SYSTEM

This invention relates to the determination of energy usage among several users, and more particularly to the allocation of costs of heating or cooling energy among users in multi-room, multi-story commercial, industrial or residential structures.

Air cooling and heating in multi-room, multi-story structures presents a number of problems, particularly where flexibility of design is desired. For example, many buildings employ a central air conditioning and heating system which requires the installation of expensive duct work, complex control systems and is quite difficult to alter, once installed. Consequently, the art has developed systems which employ individual modules or heat-exchange terminals served with hot or cold water from a central circulating system or zone. Each terminal, generally a fan-coil system, contains a heat exchanger in the form of a number of coils of tubing through which the hot or cold water is pumped. Each terminal also contains an electric motor-driven fan to move an air stream past the heat exchanger so as to provide heat exchange between the moving air and the coils. The motor drive for the fan usually has a control with a number of different speed settings to control the air flow through the heat exchanger, as well as the usual manually-operated on/off control which optionally may also be controlled by a settable thermostat.

Alternatively, air conditioning can be achieved using other known devices, such as individual heat pumps, as the heat exchange terminals. Each such pump includes a motor-driven compressor which serves to transfer the heat exchange medium from low to high pressure. As in fan-coil units, heat pump motors usually have selective controls which may be manually operated by the occupant of the space being heated or cooled.

Particularly with fan-coil units it has been difficult technically and economically to obtain a measure of the energy consumption per terminal and consequently per room, because the circulating water is either heated or cooled centrally and the cost of such cooling or heating is the major expense in operating fan-coil terminals. Of course, it is desirable to obtain such measure not only for the purpose of allocating energy costs to the owners or occupants of various rooms, but also to make the user cost-energy conscious.

To these ends then the present invention generally comprises a system for allocating energy costs among several users of heat exchange terminals, which terminals are of the type comprising a heat exchanger and an electrically driven motor having on-off and speed controls, particularly a terminal employing a motor-driven fan for circulating air through the heat exchanger.

Briefly described, the invention comprises a system for allocating energy usage among a plurality of heat exchangers each of which comprises heat exchanger means and electrically driven motor means, the latter including electrical controls for controlling motor operation. The system includes individual monitoring means, each coupled to a respective one of the motor means for monitoring the operation of that motor means and for providing data signals indicative of the status (e.g. on-off and speed) of the controls and thus of the operation of each motor. Central control means are provided in electrical communication with all of the monitoring means. The control means includes means for cyclically polling each monitoring means at a corresponding unique address, and responsively to such polling, each monitoring means provides to the control means the signals indicative of the operation of the corresponding driving motor. The control means also serves to calculate, based on the operating time and speed of each motor, the energy costs per unit time at least for each polled monitoring means. Means are also preferably included for displaying the calculated energy costs.

More specifically, as applied to fan-coil terminals, the system of the invention is based upon a general assumption that the temperature of the heat-exchange fluid or water supplied from the central system is approximately uniform. The invention permits the allocation to each heat exchange terminal of a proportion of the cost of heating (or cooling as the case may be) the centrally-supplied fluid. For example, for two identical terminals, both drawing heat from the centrally-supplied fluid for the same period of time, but operating at different fan speed, the higher speed user will be using more energy and should pay a larger proportion of the cost.

The invention monitors the operation of the motor-drives in the heat exchange terminals, preferably simply by determining the operative function of the motor control switch, i.e. on, off, high or low, in terms of the voltage applied at the appropriate electrical input terminals of the motor. Provision can be made readily to accommodate the system for additional motor speed settings. Such monitoring is accomplished with an inexpensive electronic sensing module hereinafter described, coupled to the electrical inputs to the motor. The sensing modules are electrically connected to at least one supervisory console located in some predetermined area in the building. Connection between the central console and the sensing modules can be made through a single, low-cost multi-conductor cable. Each monitoring module is adapted to be coded with a unique address corresponding to the respective heat exchange unit that it monitors.

The supervisory console, typically including a simple digital computer, is programmed to poll periodically the sensing modules for information regarding the status of the electrical inputs to the respective fan motors, and therefore can develop a measure of the energy usage per heat exchange unit, per apartment and for the building. Indeed, the invention is not limited for use in a single building because the units in a multiple group of buildings can be tied to a single supervisory console. Nor is the system of the present invention limited to use of a particular size or type of motor-driven heat exchange unit or the number of heat exchange units per apartment, for inasmuch as the sensing module associated with each heat exchange unit has a unique identification or address, the information from that sensing module can be scaled accordingly by the computer when determining the relative proportion of heat energy required by the particular heat exchange unit.

Other objects of the invention will in part be obvious and will in part appear hereinafter. The invention accordingly comprises the apparatus possessing the construction, combination of elements, and arrangement of parts which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 1:
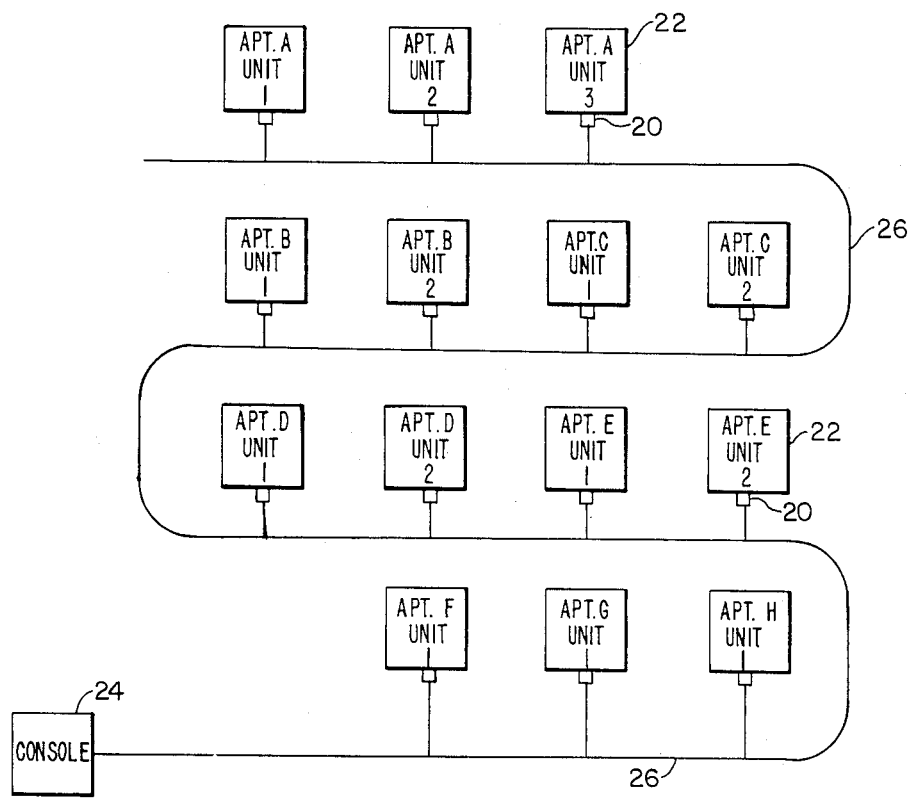
FIG. 1 is a block diagram showing the present invention including a plurality of heat exchange units at different locations, coupled to a supervisory console through a serial or threaded multi-conductor cable.
Figure 2:
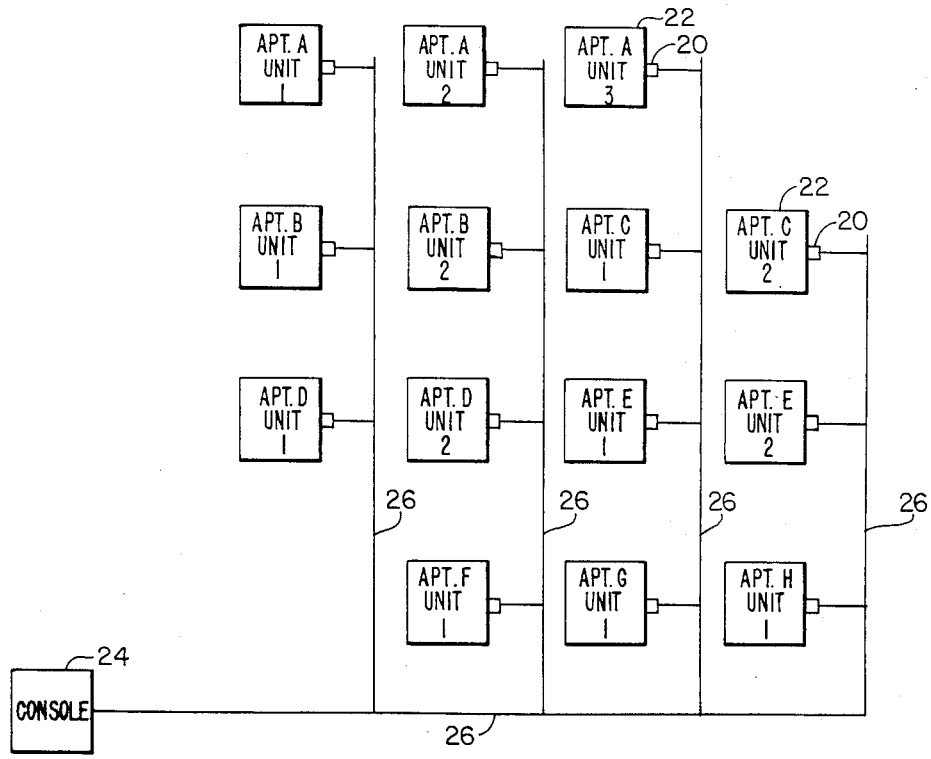
FIG. 2 is a block diagram of another modification of the present invention showing a plurality of heat exchange units at a number of different locations coupled to a supervisory console through a parallel configuration of multi-conductor cables.

The apparatus of the present invention, as particularly shown in FIG. 1, comprises individual monitoring means shown as sensing modules 20 each associated with a corresponding heat exchange unit 22, and a centrally located supervisory console 24 for a building. Each sensing module 20 is electrically connected to supervisory console 24 typically by multi-conductor cable 26 along which signals may be transmitted in parallel. Cable 26 typically is a 15-conductor, 22-gauge, stranded wire, flexible cable which may be readily installed in new or renovated buildings. However, the present invention also contemplates the use of a single strand dedicated cable along which the desired electrical signals can be transmitted serially. As shown in FIG. 1, all sensing modules 20 may be connected through a single threaded multi-conductor cable 26 to console 24. Alternatively, as shown in FIG. 2, if it is desired to follow the risers in a building, a plurality of communication cables 26 may be employed. It is not necessary to use special cables because the power line itself may be employed to transmit communication signals. However, the use of the power line can create problems such as cross-talk, transients and the like, and requires a more expensive and complex sensing module circuit. The use of a multi-conductor dedicated line appears to be the simplest and least expensive communication path along which signals are to be sent in the present invention.

Figure 3:
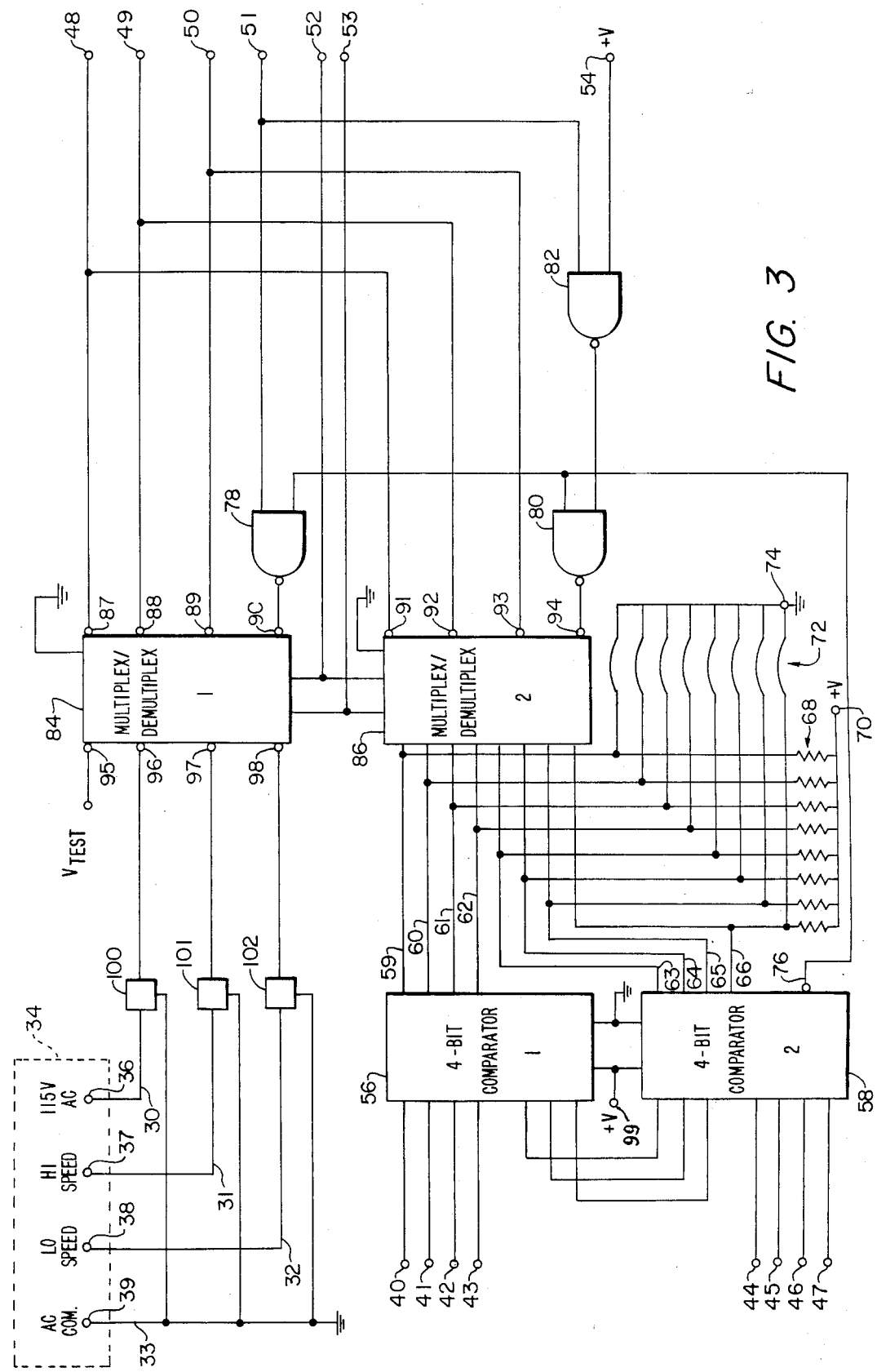
FIG. 3 is an exemplary block diagram of a circuit of a sensing module of the present invention, coupled to a junction box for a typical fan motor of a heat exchange unit.

Sensing module 20, a typical circuit of which is shown in FIG. 3, is typically formed as a printed circuit board which preferably can be disposed in or adjacent the electrical junction box serving the corresponding heat exchange unit which the sensing module is to monitor. The sensing module of FIG. 3 typically includes four leads 30, 31, 32 and 33 for electronically connecting the module to junction box 34 (shown in broken line only) respectively at terminal 36 for line voltage, terminal 37 for high speed motor setting, terminal 38 for low speed motor setting and terminal 39 for AC common or ground. Each module of FIG. 3 also includes a multipin header, typically of 15 pins respectively identified by reference numerals 40 to 54 inclusive, that permits the sensing module to connect through multi-conductor cable 26 to control console 24.

The circuit shown in FIG. 3 basically comprises comparator means for effecting addressing of the sensing module and multiplex/demultiplex means for determining and reporting the status of the electrical inputs of the driving motor of the corresponding heat exchange unit. Typically, the comparator means can be formed of two 4-bit comparators 56 and 58, such as Model 74C85 comparator chips commercially available from Texas Instruments, Dallas, Tex.

First comparator 56 is provided with four input address lines respectively coupled to pins 40, 41, 42 and 43. Similarly, second comparator 58 is provided with four input address lines connected to pins 44-47 inclusive. These eight lines, operative in parallel in an ON-OFF or binary mode, as well known in the art, represents 256 states, each of which can constitute an address. Comparator 56 also includes four input comparison lines 59 to 62 inclusive and second comparator 58 includes a like four input comparison lines 63 to 66 inclusive. Each of lines 59 to 66 is coupled through a corresponding resistance 68 to a voltage supply, typically at 12 volts, at terminal 70, and is also connected through a respective one of switches or jumpers 72 to ground at terminal 74. Comparator 58 is provided with Enable output terminal 76 connected as respective inputs to first NAND gate 78 and second NAND gate 80. The other input of NAND gate 78 is connected to pin 51. The other input to second NAND gate 80 is connected to the output of third NAND gate 82. The inputs to the latter are respectively connected to pins 51 and 54.

The sensing module shown in FIG. 3 also includes first and second multiplexers/demultiplexers 84 and 86 (hereinafter referred to respectively as mux 84 and mux 86). These latter are typically single eight-channel analog multiplexers/demultiplexers, such as Model CD4051 chips available from National Semiconductor Corporation, Santa Clara, Calif. These analog multiplexers/demultiplexers are digitally controlled analog switches having three binary control inputs at which a combination of three binary signals selects a corresponding one of eight channels to be turned ON and connect an analog input of the chip to the output channel. Such multiplexer/demultiplexors also include an inhibit input terminal at which a logical "1" or up signal will turn all channels to the off state. Thus, mux 84 has its three binary control input terminals 87, 88 and 89 respectively connected to pins 48, 49 and 50, and its inhibit input terminal 90 connected to the output of NAND gate 78. Similarly, mux 86 has its three binary control input terminals 91, 92 and 93 connected respectively to pins 48, 49 and 50, and its inhibit input terminal 94 connected to the output of NAND gate 80.

Mux 84 also preferably has four data or analog signal input terminals 95, 96, 97, and 98, while mux 86 has eight data input terminals respectively connected to lines 59 to 66 inclusive.

Because the maximum voltage of the analog signals which can be applied to mux 84 is usually limited, means are preferably provided for proportioning the voltage seen at leads 30, 31 and 32. Such means typically are in the form of rectifying voltage dividers are shown in the block diagram at 100, 101 and 102 respectively connecting lead 30 to input terminal 96, lead 31 to input terminal 97 and lead 32 to input terminal 98. Ground lead 33 in turn is connected to provide system grounds to the voltage dividing networks in rectifying voltage dividers 100, 101 and 102. Terminal 95, which constitutes a test terminal, has a fixed voltage, typically a known fraction of 12 volts dc, applied thereto.

In operation of the circuit of FIG. 3, a polling request sent by supervisory console 24 appears as an eight-bit binary address signal on pins 40 to 47 inclusive. The address signal is then compared in comparators 56 and 58 with signals on comparison lines 59 to 66 inclusive. If a match is made in the comparison of the external address on terminals 40 to 47 inclusive with the internal signals on lines 59 to 66 inclusive, an enable signal (logical "1") appears at terminal 76 of comparator 58. Each module can be readily assigned its own unique code upon installation by cutting the requisite ones of jumpers 72, or if the latter are switches, then by opening them. For example, if one wants to establish the binary number 00000010 (or decimal "2") as the unique code for a particular module, one simply cuts the jumper 72 connected to line 60. This disconnects line 60 from ground and placed it at a logical "1" voltage determined by the voltage on terminal 70 and the resistance of an appropriate one of resistors 68.

It will be seen that a control signal originated by supervisory console and appearing at pin 51, when combined with an enable signal from terminal 76 of comparator 58, will determine which of mux 84 or 86 will be enabled and which will be disabled. A logical "1" in the form of a fixed voltage always appears at pin 54 so that NAND gate 82 will provide a logical "0" or "1" only when the signal at pin 51 is respectively a logical "1" or "0". Thus, the output of gate 78 enables mux 84 as the output of gate 80 disables mux 86 and vice versa.

It will be apparent that although the binary combination of signals at pins 48, 49 and 50 can provide eight distinct selection signals, a sequence of only four of such selection signals is required to poll the various inputs to mux 84, i.e. to connect input analog terminals 96, 97, 98 and test terminal 95 to output terminal 53 sequentially. Similarly, when mux 84 is disabled and mux 86 is therefore enabled, the internal address signals on lines 59 to 66 are serially transferred to terminal 53 accordingly as the state of the binary signals at terminals 91, 92 and 93 changes in sequence.

Information placed on line 53 from enabled mux 86 serves to verify the address and to insure that a response has been received from the correct module as terminals 48, 49 and 50 are stepped through the eight binary selection signals. When mux 84 is enabled, the input signals at terminals 95, 96, 97 and 98 appear sequentially as output signals at terminal 53, responsively to the stepping of the binary signal at terminals 48, 49 and 50 through four of the possible eight values. The signal at terminal 53 then represents the state of the voltages indicative of the nature of the operation of the fan motor at that time (i.e. high, low or reference respectively at terminals 97, 98 and 96 respectively) and also the test voltage seen at terminal 95.

The address signals applied to pins 40 to 47, the mux control signal at pin 51, the mux sequencing signals at pins 48 to 50, the ground at pin 52 and the fixed voltage at pin 54 are all provided on parallel conductors arising at an address interface or junction box where the module header connects to cable 26. A similar interface is provided for data where pin 53 is coupled to an appropriate one of the conductors in cable 26. The fixed voltage at pin 54 generally provides the necessary voltage or low power input for the integrated circuit chips in FIG. 3, where indicated by +V as at pin 99.

Figure 4:
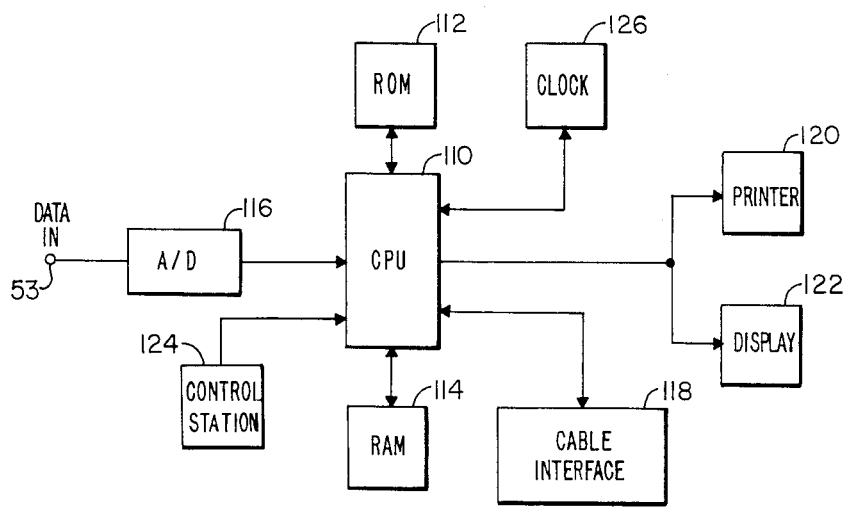
FIG. 4 is a block diagram of an exemplary console of the present invention.

Control of a plurality of sensing modules is accomplished from a central supervisory console which typically comprises, as shown in FIG. 4, a suitable combination of a digital central processing unit, a program source, a temporary memory and associated peripheral devices, or can be formed as a hard-wired unit if desired. For simplicity in exposition, the central control console will be described as a combination of hardware and software as is shown in FIGS. 4 and 5.

Figure 5:
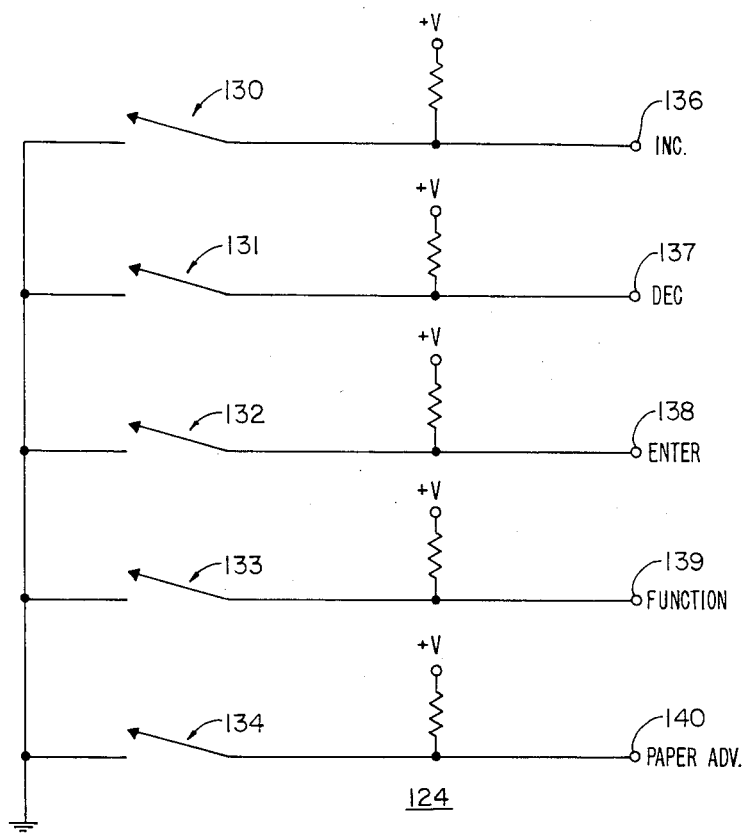
FIG. 5 is a circuit diagram of a manually operable switching control module of FIG. 4.

In the embodiment shown in FIGS. 4 and 5, the central console comprises central processing unit (CPU) 110, typically formed of a Z80A microprocessor chip currently commercially available from Zilog, Inc., Cupertino, Calif. Coupled to CPU 110 is read-only memory (ROM) 112, such as a D2732A memory chip (commercially available from Intel Corp., Santa Clara, Calif.), and in which a program for operating the system has been prestored. Also connected to CPU 110 is random access memory (RAM) 114 such as an HM6264LP chip available from Hitachi America, Ltd., San Jose, Calif. Connected to the data inputs of CPU 110 is the output of analog-to-digital converter (A/D) 116, typically an AD7574JN chip available from Analog Devices, Norwood, Mass. The input to the latter is connected to the conductor in cable 26 which in turn connects with pins 53 of the several sensing modules. CPU 110 is also coupled as an input to cable interface or junction box 118, the output of the latter being connected to the several other conductors of cable 26.

The output of CPU 110 is also connected as respective inputs to keyboard or computer operated printer means 120 and display means 122, such as an AND-5010-R-CJB alpha-numeric LED display from AND Co., Burlingame, Calif., driven by an ICM7234AIJL display driver from Intersil, Inc., Cupertino, Calif. The central control unit of FIG. 4 also includes a plurality of control switches disposed in manually operable control station 124, the output of which is coupled to CPU 110, printer 120 and display 122.

The system of FIG. 4 also includes other elements such as system clock 126 (typically an M5M-5832IRS chip available from Oki Semiconductor, Santa Clara Calif.) connected to CPU 110. Other elements, as would be apparent to one skilled in the art, are also preferably included in the apparatus of FIG. 4, but are not shown for the sake of simplicity in exposition. For example, the elements shown in FIG. 4 require means for powering the various elements. Preferably, means such as a battery, is provided for backup power in the event of a power interuption, thereby insuring that at least stored information is not lost, and preferably insuring that the operation of the system will continue despite loss of line power.

CPU 110, together with the program stored in ROM 112 and pertinent information stored in RAM 114, and subject to control signals entered at control station 124, determines the operation of the system and performs all necessary calculations and decisions. The program in ROM 112 is essentially based upon the flow diagram of FIG. 6. RAM 114 is intended to store the data acquired during the operation of the system, and other information, such as may be necessary to prepare appropriate invoices or bills, entered into the RAM through manually operable switches or pushbuttons in control station 124 as will be described hereinafter. System clock 126 is provided to time the polling period, i.e. the time interval between each complete sequence of polling of all of the sensing modules.

In the prefered embodiment, as shown in FIG. 5, control station 124 includes typically five switches 130 to 134 inclusive for respectively switching terminals 136 to 140 inclusive between a voltage, typically 5 volts when the switches are open, and zero volts or ground when the switches are closed. Means, not shown, are also preferably included so that the switches are spring biased normally in an open position, and the switching system also may include interlocks so that only one switch may be depressed at a time. Switches 130 to 134 inclusive are respectively labeled Increment, Decrement, Enter, Function and Paper Advance, each representing an operation of the central console which station 124 controls.

RAM 114 is organized into a number of memory locations, particularly a set of registers for the storage of data indicating the state of the motor controls and therefore the energy usage per terminal, another memory location to hold data relating to the time and date as incremented automatically by the system clock, and a memory location to write and store information pertinent to the billing for energy usage, i.e. the costs of energy used to heat the central heat-exchange fluid or the costs of electricity for driving compressors and the like. Because the only information needed to be determined from data provided by each sensory module is whether either the high or low motor setting is on (all other states being then off), data storage becomes quite simple. During each polling period the state of a given sensory module can be defined by the counts in two counters or bins, respectively incremented by a single bit during each typical six minute period accordingly as the "high on" or "low on" state of the motor voltage is determined. Hence two storage locations in RAM 114 can constitute such counters or bins. If a typical polling period is six minutes, then each sensory module will be polled 240 times a day and the maximum size required of any bin is simply that needed to store a single 8-bit byte. Assuming that an installation includes 100 sensory modules, then a daily requirement for data storage in RAM 114 would be two 8-bit bytes, 100 each for the high and low use information. Thus for a 30-day month, the total data storage requirements for heat exchange operation would be merely 6 kilobytes if billing is to be done on a 30-day basis and the memory space recycled. More daily data may be accumulated and stored simply by employing a larger memory.

Figure 6:
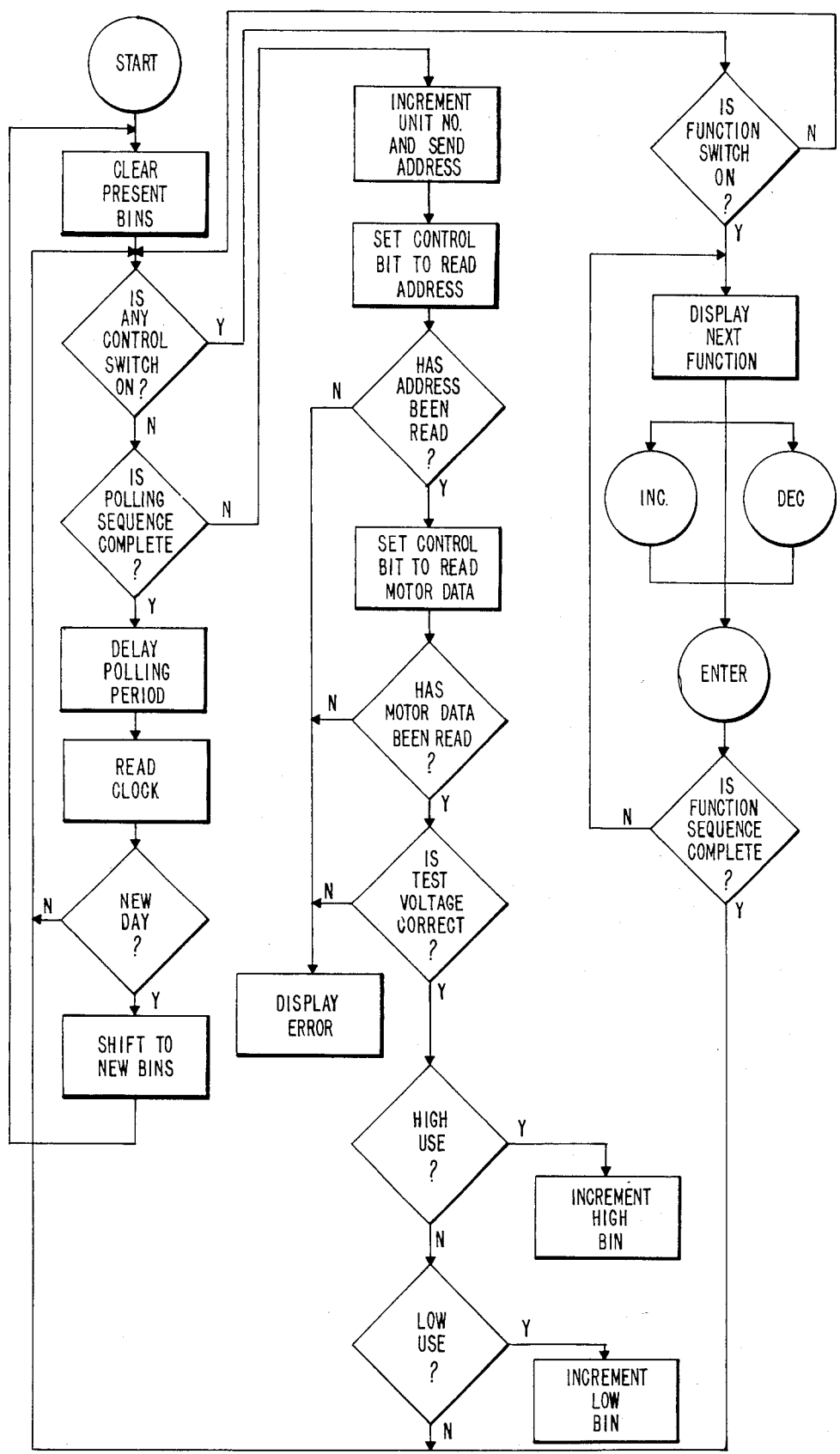
FIG. 6 is a flow chart of an exemplary program for controlling the elements of the present invention.

The operation of the apparatus of FIGS. 4 and 5 can be most advantageously described in connection with the flow diagram of FIG. 6 which represents a simplified program for controlling the operation of the system. When the system is started, as by plugging or switching it onto a power source, CPU 110 processes the first command stored in ROM 112, and clears each storage portion or bin in RAM 114 preassigned to store data. Once the bins are cleared, CPU 110 reviews the status of the system to make sure that none of the function switches in control station 124 is depressed or on. If any switch other than switch 133 is on, the system recycles to determine if any switch is on and will do so until none of the switches are on.

When Function switch 133 is turned on, then CPU 110 starts the first of a series of automatic sequences of displays on display 122. The first of these display sequences is a dating sequence in which the first display for example is the date and time as then stored in RAM 114 as a function of the operation of system clock 126. If the date is wrong, the operator can advance the date or reverse the date respectively by depressing Increment switch 130 or Decrement switch 131. Once the correct date is displayed, it can be stored in RAM 114 in place of incorrect data, by the operator of the system depressing Enter switch 132. Upon operation of switch 132, CPU 110 also checks the program to see if all of the functions in that particular sequence have been completed. If not, the next function such as the time of day is displayed on display 122, and corrected, if necessary, and entered as before.

Each time the Function switch is depressed, the system will also proceed to the next sequence of stored functions. Each time the Enter switch is depressed, it causes the display at that time to be stored and triggers display of the next function in that particular sequence. For example, the function "date" when displayed on display 122 would be sequenced through year, month, day, hour and minute upon successive operation of Enter switch 132. The function "bill" would sequence through the year and month or other period which the bill was intended to cover, ask for entry of data (through operation of the Increment, Decrement and Enter switches) such as fuel costs and the like necessary for computation of the bill, the CPU will be ordered to take the necessary data from RAM 114 and compute the bill, and the last depression of Enter switch 132 would activate printer 120 to print out the computed bill with identifying date information. Other functions such as "test" and the like can easily be implemented as desired.

The operation of Paper Advance switch 134 simply controls the paper advance of feed mechanism in printer 120 in known manner. Programming to produce the desired instruction stored in ROM 112 to effect the operation of the control switches and to carry out the desired microprograms controlled by each switch are well within the skill of the art and, being variable over a wide range according to the specific configuration of heat-exchange units being controlled and the wishes of the controlling individual, are not further described here.

Once all of the steps of a particular function have been performed in a sequence, the system returns again to the position in the control loop where it again is interrogated as to whether any control switch is on. If no control switch is on, then the program requires that the system determine if the polling sequence is complete, i.e. if all of the sensory modules have been polled. Typically, this is easily effected by using a portion of RAM 114 as a polling counter which is automatically incremented by the ROM program each time the polling of a module is completed. If the module count then stored is less than the total number of modules, then clearly the polling sequence has not been completed. If the polling sequence has been completed, then the system is ordered to delay for some predetermined period of time measured by the system clock. For example, a complete polling cycle would poll each unit in sequence at a rate of once every six minutes, so the delay introduced would insure that a full six-minute period occured between successive starts of polling sequences.

Following the delay, the ROM program orders the CPU to read the system clock and decide if a new data storage period, such as a day, has been completed. If not, then the program recycles to the position in the loop where it again queries as to the state of the control switches. If, on the other hand, the system clock indicates that a new day has indeed started, the program orders the CPU to shift data storage in the RAM to a new set of bins into which the data for the new day would be stored. As soon as the new bins are established in RAM 14, the program recycles to the point where all of the new bins are ordered to be emptied or cleared.

If the system finds that the polling sequence has not been completed, it orders the unit number of the sensory modules, stored in RAM 114, be incremented by one, and the address of that sensory module is then placed or transmitted to cable interface 118. The program then sets the condition of the control bit at terminal 51 to enable mux 86, and the addressed module should then respond to indicate that the appropriate match between the internal and external address signals has been made.

The program then determines whether the address has been read. If not, display 122 or printer 120 or both are activated to provide a visible indication that an error has occurred. If the sensory module has properly responded, then the program orders the setting of the control bit at pin 51 of the appropriate module to enable mux 84 to read the motor data. The system is then queried to determine if the module data has been read, and if not, then indication or error is again displayed on display 122 or printer 120. If the motor data has been read, and therefore converted in A-D converter 116 and fed through CPU 110, the program first queries if the test voltage at terminal 95 is correct, and if so, then determines whether the difference between the high and low signals is greater than some predetermined minimum. This latter test simply insures that the high and low signals can be distinguished from one, keeping in mind that the signals per se are arbitrary voltages which may differ substantially from one another depending upon the type of heat exchange equipment to which the sensory module is coupled. If neither the test voltage as seen at terminal 95 or the difference between the high and low signals is acceptable, then again display 122 provides an indication of error. It should be kept in mind that everything shown on the display can also be duplicated in hard copy or printer 120 if desired.

The system now determines whether the motor controls indicate that the heat exchanger is operating on high or on low and accordingly increments the appropriate bins in RAM 114. Following incrementing of the appropriate high or low bin, the system is again returned to the point in the loop where again the cycle of determining if a control switch is being operated, and if not, proceeds to poll the next sensory module in the sequence.

The program in the ROM preferably insures that every twenty four hours a new 2-byte bin or register is assigned to a given sensing module by address to keep track of the motor operation and therefore the activity of that heat exchange terminal during the following day. It is apparent that the operator of the system may, through a combination of programmed instructions in the ROM and operation of the various function switches, alter the operation of the polling cycle, address any particular terminal and display the data pertinent thereto, display cumulative information, print out the individual information for the total number of terminals, and even perform a statistical analysis of the operation of the total heating/cooling complex.

Since certain changes may be made in the above apparatus and process without departing from the scope of the invention involved, it is intended that all matter contained in the above-description or shown in the accompanying drawing shall be interpreted in an illustrative and not in a limiting sense.

What is claimed is:

1. A system for allocating energy usage among a plurality of heat exchange terminals each of which comprises heat exchanger means and electrically driven motor means including electrical controls for controlling the operating state of said motor means so that said motor means is operable at at least one discrete operating speed and so that said motor means may be turned off, said system comprising:
   individual monitoring means each coupled to a respective one of said motor means for monitoring the operating state of each of said motor means and for providing a different electrical data signal for each said operating state, each of said monitoring means having associated therewith a unique address code;
   central control means;
   means providing electrical communication between each of said monitoring means and said control means;
   said control means including means for sending signals cyclically polling each of said monitoring means at its unique address code to provide back to said control means said electrical data signals indicating the operating state of each said motor means associated with the polled monitoring means.

2. A system as defined in claim 1 wherein each of said motor means includes an electrically driven motor coupled to the electrical controls of said motor means and each of said monitoring means is connected to the electrical controls for the associated motor so that the operating state, when polled, of said each motor may be determined.

3. A system as defined in claim 2, wherein each of said controls includes switch means connected for establishing the speed of said motor, and wherein said motor is a multispeed electrical motor with at least high and low speed control power input terminals, the connection of which is controlled by said switch means, and
   wherein said monitoring means includes at least two terminals respectively connected so as to measure the voltage level at each of said control input terminals of said motor and another terminal connected so as to measure the voltage level at some predetermined reference potential.

4. A system as defined in claim 1 wherein said means providing electrical communication comprises a multiconductor stranded flexible cable connected to each of said monitoring means.

5. A system as defined in claim 1 wherein each of said monitoring means includes:
   means for assigning said unique address code to said monitoring means,
   means for comparing address signals from said control means with said unique address code, and
   means for providing confirmation signals back to said control means indicating that said address signals match said unique address code.

6. A system as defined in claim 5 wherein said means for comparing comprises a comparator connected between an internal source of said unique address code and said means providing electrical communication.

7. A system as defined in claim 6 wherein said comparator is adapted to generate an enabling signal when said address signals match said unique address code, and said means for providing confirmation signals to said control means comprises multiplexer/demultiplexer means connected to said comparator and responsive to said enabling signal for providing said confirmation signals.

8. A system as defined in claim 5 wherein each of said monitoring means also includes means connected to said electrical controls for generating said electrical data signals in accordance with the voltages at said controls.

9. A system as defined in claim 8 wherein said means connected to said electrical controls comprises analog multiplexer/demultiplexer means.

10. A system as defined in claim 8 wherein said central control means includes means for generating a control signal for alternatively controlling the operation of said means for providing confirmation signals and said means for generating said electrical data signals.

11. A system as defined in claim 1 including clock means for establishing time periods, and means for calculating from said electrical data signals the energy costs for selected ones of said terminals over a predetermined time period established by said clock means.

12. A system as defined in claim 11 including means for displaying said calculated energy costs.

* * * * *